No. 743,196. PATENTED NOV. 3, 1903.
K. REYSCHER.
DRYING ROOM.
APPLICATION FILED OCT. 31, 1901.
NO MODEL.
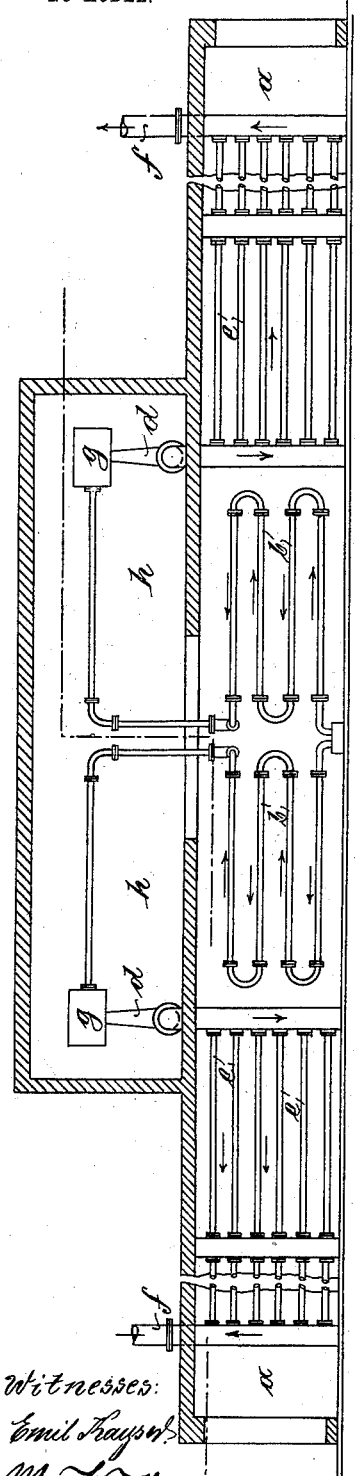
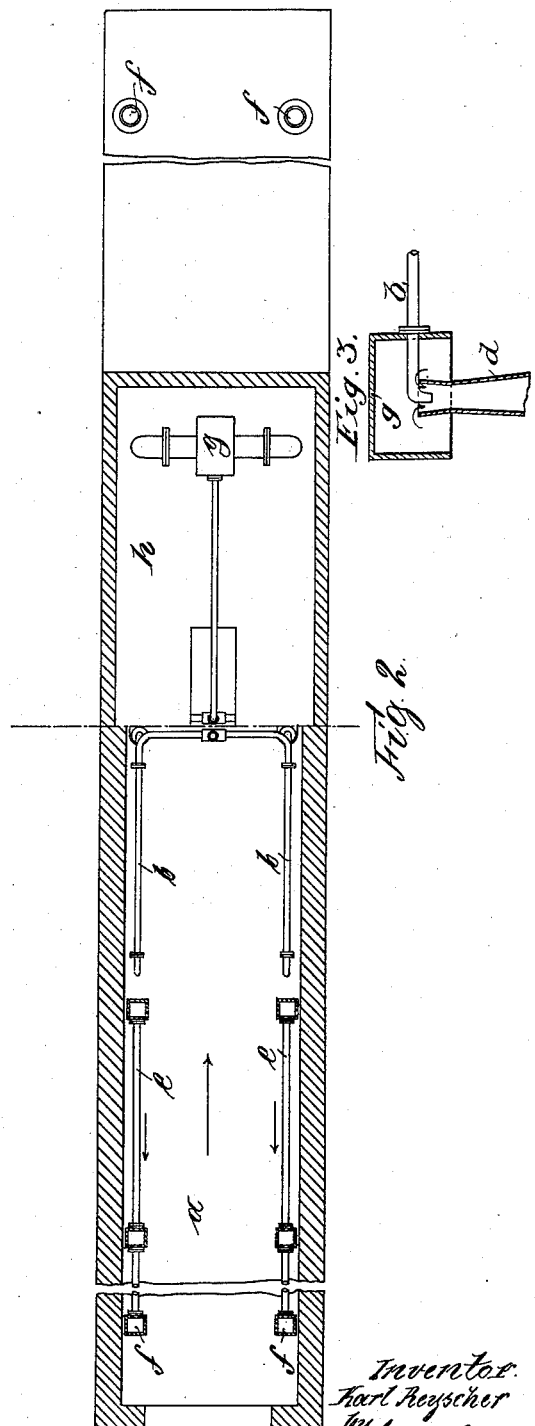
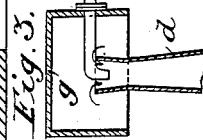
Witnesses:
Inventor:
Karl Reyscher
Attorney.

No. 743,196. Patented November 3, 1903.

UNITED STATES PATENT OFFICE.

KARL REYSCHER, OF BIELEFELD, GERMANY.

DRYING-ROOM.

SPECIFICATION forming part of Letters Patent No. 743,196, dated November 3, 1903.

Application filed October 31, 1901. Serial No. 80,662. (No model.)

*To all whom it may concern:*

Be it known that I, KARL REYSCHER, a subject of the King of Prussia, German Emperor, and a resident of 7 Zimmerstrasse, Bielefeld, in the Province of Westphalia, German Empire, have invented certain new and useful Improvements in Drying-Rooms, of which the following is an exact specification.

My invention relates to improvements in drying-rooms in which the heat of the air saturated with water and leaving the drying-room is used again for heating the dry air entering the drying-room.

The purpose of my invention is to use steam for heating the drying-room, which steam is utilized at the same time for pressing the hot air saturated with water and leaving the drying-room toward the entrance of the drying-room, where the heat still contained in this air is utilized for heating the cold dry air.

In order to make my invention more clear, I refer to the accompanying drawings, in which—

Figure 1 is a vertical longitudinal section of a drying-room constructed according to my invention. Fig. 2 is a horizontal section on line A B of Fig. 1. Fig. 3 is a vertical section of the steam-blast for sucking off the air saturated with moisture.

The drying-room consists of a long channel $a$, into which the drying ware is brought from one side and passed over to the other side. In the middle of the channel $a$ steam-pipes $b$ are arranged. Above these steam-pipes a chamber $h$ is situated, which is adapted to take up the heated air. Within the chamber $h$ steam-blasts $g$, connected to the steam-pipes $b$, are provided, which steam-blasts serve for sucking the air through the channel $a$ into the chamber $h$. The steam-blasts $g$ at the same time blow the air contained in the chamber $h$ through the pipes $d$, the branch pipes $e$, and the pipes $f$ back into the atmosphere or to any other place where the heated air can be utilized. The pipes $e$ are situated within the channel $a$, so that the heated air contained in the chamber $h$ and blown through the pipes $e$ serves again for heating the air entering the channel $a$ and streaming toward the middle of the same. It is herewith attained that the heat of the air which has passed the channel $a$ and is in consequence hereof to a certain degree saturated with moisture is not lost, but is used again for heating the dry air entering the channel $a$. The air which enters the middle part of the channel $a$ is only able to take up very little moisture and is therefore no more fit for the drying purpose. Therefore the air is led back through the pipes $e$, so that the same cannot come directly in contact with the drying air entering the channel and mix with the same, but can transmit its heat to this drying air on account of being led through the pipes $e$, along which the drying air streams.

By using the steam streaming through the steam-pipes $b$ and serving for heating the middle part of the drying-channel for sucking air through the channel and blowing the same back through the heating-pipes $e$, a great advantage is attained, as in consequence hereof no special ventilator or fan is necessary and as the heat still contained in the steam is still utilized by the steam leaving the pipes $b$ passing the heating-pipes $e$ together with the heated air situated in the chamber $h$.

It will be understood that the chamber $h$ can be situated just as well underneath the channel $a$, but advantageously it is arranged above the same on account of the heated air always streaming upward.

Having thus fully described the nature of my said invention, what I desire to secure by Letters Patent of the United States is—

In a drying-room, the combination of a drying-channel $a$, with steam-pipes $b$ situated within the same, a steam-blast $g$ connected to the steam-pipes $b$, and pipes $e$ connected to the steam-blast and situated within the channel $a$, said pipes being adapted to lead the heated air back to the ends of the channel $a$ substantially as described and for the purpose set forth.

In testimony whereof I have signed my name to this specification in the presence of two subscribing witnesses.

KARL REYSCHER.

Witnesses:
WM. ESSENWEIN,
P. LIEBER.